Jan. 22, 1963 T. D. PARKS 3,074,548
HYPOCHLORITE BLEACH BOTTLE
Filed March 20, 1961
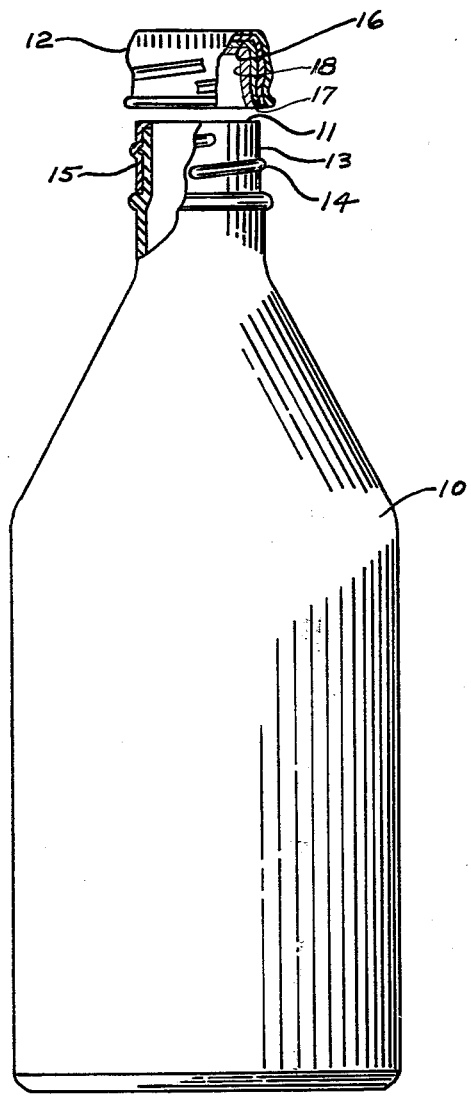
INVENTOR.
THOMAS D. PARKS,
BY Richard C. Witte
ATTORNEY.

United States Patent Office 3,074,548
Patented Jan. 22, 1963

3,074,548
HYPOCHLORITE BLEACH BOTTLE
Thomas D. Parks, Wyoming, Ohio, assignor to The Clorox Company, Oakland, Calif., a corporation of Ohio
Filed Mar. 20, 1961, Ser. No. 96,836
1 Claim. (Cl. 206—84)

This invention relates to a glass bottle having an organo-siloxane coated pouring lip, which contains liquid hypochlorite bleach and which is capped with a tin-plated, iron-based metal closure.

Sodium hypochlorite liquid bleach has been marketed in glass bottles for many years. The closures for such bottles have long been a problem. Early bleach bottles were corked with rubber plugs. Such plugs were unsatisfactory because of venting and other problems. Threaded plastic caps were used but caused problems because they loosened easily and were easily broken. Iron-based caps and tin-plated, iron-based caps were satisfactory from venting and tightness considerations, but caused serious corrosion problems when used on the conventional glass bottles. Aluminum caps came into widespread use because they overcame such corrosion problems, and, of course, were non-breakable. Aluminum caps, however, are expensive and are difficult to apply to threaded glass bottles with the desired degree of tightness. Tightness is important because a loose cap causes leakage of the bleach solution when the bottle is in transit.

Thus, it would be desirable to be able to utilize the economical and tight-fitting iron-based closures on hypochlorite bleach bottles without encountering serious corrosion problems. It is an object of this invention to provide a glass bottle containing liquid hypochlorite bleach which is capped with an economical, tight-fitting, iron-based metal closure, whereby corrosion of the closure is markedly reduced.

This and other objects are achieved in a glass bottle having a metal cap, which is a tin-plated, iron-based metal cap, and containing liquid hypochlorite bleach, the pouring lip area of such a glass bottle having a water repellant film of an organo-polysiloxane. Preferably, the organo-polysiloxane film is a cured film and the interior of the metal cap has a vinyl resin over an epoxy resin coating.

The single figure of the drawing is a vertical, partial-sectional view of a glass bottle showing the pouring lip area, the film of organo-polysiloxane, the tin-plated iron-based metal cap and the vinyl resin over epoxy resin coatings on the interior of the cap. In the drawing the thickness (outside of the bottle) of the organo polysiloxane film, the thickness of the vinyl resin and epoxy resin coatings and the thickness (inside of the cap) of the tin plate are exaggerated.

The Handbook of Glass Manufacture by Fay B. Tooley (Odgen, 1953) discusses the accepted terms for the parts of the bottle 10 on pages 304, 311 and 312. The sealing surface 11 of the bottle is the uppermost horizontal surface when it is in an upright position and is the surface which bears against the cap 12 to seal the bottle 10. The finish 13 of a bottle is the top section of the bottle containing the screw threads 14 or other exterior details and through which the bottle is filled. The pouring lip area of the bottle consists of the sealing surface and the adjacent exterior area of the finish.

The organo-polysiloxane film 15 which is on the pouring lip area of the bottle, is formed by applying to this area an organo-polysiloxane fluid. The fluid should be non-volatile and should have a viscosity at 25° C. in the range of about 20 to one million centistokes, preferably one thousand to one hundred thousand centistokes. Examples of suitable organo-polysiloxane fluids are the high molecular weight dimethyl polysiloxanes, diethyl polysiloxanes, methyl polysiloxanes, phenyl polysiloxanes. The preferred organo-polysiloxane fluid is a high molecular weight dimethyl polysiloxane. This preferred material is commercially available as Dow-Corning 200 fluid. The chemistry and characteristics of organo-polysiloxanes are described in "Silicones" by R. N. Meals and F. M. Lewis (Reinhold, 1959).

The organo-polysiloxane film 15 can be formed on the pouring lip area of the bottle 10 by any suitable means. The organo-polysiloxane can be brushed on, applied by dipping or spraying on. If desired, the organo-polysiloxane can be applied in a solvent such as perchloroethylene dichloride or carbon tetrachloride. The film should completely cover the sealing surface and extend at least about $\frac{1}{16}$ of an inch down the exterior portion of the finish. Desirably, the film covers all of that exterior portion of the finish which comes in contact with the metal cap 12. The film 15 should be continuous. Not a great deal of organo-polysiloxane is required since a satisfactory film can be as thin as several hundred (e. g., 500) molecules. There are no disadvantages, however, to thicker films. The most important requirements are that the film is continuous and that it covers the pouring lip area of the bottle, i. e., the sealing surface 11 and the adjacent exterior portion of the finish 13.

A satisfactory film is obtained merely by applying the organo-polysiloxane fluid to the pouring lip area. A more durable film can be obtained, however, if the organo-polysiloxane fluid is cured after application. The curing of organo-polysiloxane films on glass surfaces is a known procedure and can be done by heating the film on the glass surface for one half to two hours and at a temperature of about 250° C. in, for example, an oven. Other methods involve the application of the organo-polysiloxane to a bottle which is still hot from their manufacture wherein the heat curing is effected from the sensible heat of the bottle. A desirable method of heat curing involves the brief application of an open flame to the organo-polysiloxane-coated glass. This method is described in co-pending application of Richard E. Melrose, Serial No. 826,432, filed July 13, 1959. The cured film is very hard and durable.

The metal cap 12 used on the hypochlorite bleach containing bottle 10 of this invention is a conventional tin-plated 16, iron-based cap 12. The cap can be threaded if the bottle is threaded or can be of the snap-on type if that is the design of the bottle. Desirably, the cap and the bottle are of the threaded type.

Preferably, the interior of the tin-plated iron cap of the bleach bottle of this invention is coated with an epoxy resin coating 17 over which there is a vinyl resin coating 18. A coating of vinyl resin alone is somewhat porous and the less porous epoxy-resin alone is too brittle. The double coating, however, provides, in addition to the tin-plate, durable protection for the iron-based metal cap.

Vinyl resins are materials derived from polymerization or copolymerization of vinyl monomers, e. g., vinyl chloride and acetate, vinylidene chloride, methyl acrylate and methacrylate, acrylonitrile, styrene, and the vinyl ethers. These monomers are characterized by the presence of a carbon double bond in the molecule which opens during polymerization to make possible the carbon chain of the polymer. For example, the polymer of vinyl chloride ($H_2C:CHCl$) is $(-CH_2CHCl)_n$.

Epoxy resins are obtained by the condensation of phenol, acetone, and epichlorohydrin. The repeating unit of the resulting polymer is reported to have the structure $-C_6H_4C(CH_3)_2C_6H_4OCH_2CHOHCH_2O-$. Free OH groups can be substituted by organic radicals as, for example, by fatty acid radicals derived from natural drying oils.

If a glass bottle containing hypochlorite bleach is capped with a tin-plated iron metal closure, or even with such a closure which is coated with a durable resin, there is no corrosion problem as long as the area of the bottle which contacts the cap, i.e., the pouring lip area, is kept free from the bleach solution. The corrosion problems arise when the bottle is in use and the bleach is poured from it from time to time. During such use, the pouring lip area becomes wetted with the bleach solution. When the cap is reapplied, the cap is no longer in contact with dry glass but instead is in direct contact with the corrosive bleach solution. In this invention, the undesirable wetting of the pouring lip area of the bottle 10 by the bleach solution during use is avoided by the presence on this area of the organo-polysiloxane film 15. This film is water repellent and prevents the aqueous bleach solution from adhering to the pouring lip area. When the cap 12 is removed and the bleach is poured from the tipped bottle, no bleach solution adheres to the pouring lip area when the bottle is righted and pouring is stopped. Thus, each time the cap is reapplied, it is applied to a dry surface free from bleach solution, thereby avoiding corrosion of the tin-plated iron-based cap by the bleach. By coating the pouring lip of a bleach-containing glass bottle with an organo-polysiloxane film, it was surprising to find that a tin-plated 16 iron-based cap, which has economic and tightness advantages, and which heretofore had been thought unusable for a bleach bottle, can be satisfactorily used.

The following examples illustrate the bleach-containing glass bottle of this invention.

*Example I*

8 glass bottles, each having a one quart capacity and a threaded neck were selected. The pouring lip area (the sealing surface and the adjacent exterior portion of the finish) of 4 bottles was coated with silicone stop-cock grease by saturating a towel with the grease and applying the grease to the pouring lip area of the bottle with the towel. Silicone stop-cock grease is more specifically defined as a high molecular weight dimethyl polysiloxane containing a few percent finely divided silica as a thickener. (See, for example, U.S. Patent 2,428,608.) The remaining 4 bottles were untreated. The 8 bottles were then filled with a 5¼% aqueous solution of sodium hypochlorite. Each of the bottles was then capped with a tin-plated (½ lb. electrolytic tin-plate) iron-based metal threaded cap, 28 mm. inside diameter, style 400. The cap had a disk insert of Vinylite, lightly waxed pulp board.

Pour tests were then conducted with the bottles. One half ounce of the hypochlorite solution was poured from each bottle twice a day until the bottles were empty. After each pouring the caps were replaced. The caps from the bottles having the organo-polysiloxane films appeared substantially unchanged at the end of the thirteenth pour. Slight rust appeared at the nineteenth pour. On the caps from the untreated bottles, rust appeared on the tenth pour. Increased rusting appeared on the fifteenth pour. Very heavy rusting appeared at the nineteenth pour.

*Example II*

12, one-quart capacity bottles having threaded necks had their pouring lip areas treated with undiluted dimethyl polysiloxane fluid from an impregnated roller. The fluid had a viscosity of 12,500 centistokes at 25° C. (Dow-Corning 200 fluid). Continuous coating of the fluid was provided on the sealing surface and the adjacent exterior portion of the finish of the bottle. The thus coated portions of the bottles were subjected to an open flame for about 1.5 seconds. This flame treatment raised the skin temperature of the pouring lip areas of the bottles to about 225° F., thereby curing the dimethyl polysiloxane film. This film was continuous and water repellant. The bottles were then filled with a 5¼% aqueous solution of sodium hypochlorite. The bottles were then capped with the tin-plated, iron-based closures described in Example I except that the interior of each cap had a coating of vinyl resin over epoxy resin. 12 other one-quart bottles having threaded necks, but with untreated pouring lip areas, were filled with 5¼% aqueous solution of sodium hypochlorite and capped with the same type caps. These bottles were compared with the 12 bottles just described. The two sets of 12 bottles each were subjected to pouring tests like the one described in Example I. After 18 days and 26 pours, the caps from the bottles having the organo-polysiloxane treated pouring lip areas showed only very slight traces of rust, while the caps from the untreated bottles showed moderate to heavy rusting.

The organo-polysiloxane treated bottles of this invention have advantages in addition to the reduction-in-corrosion advantage. The organo-polysiloxane film on the pouring lip area results in a freedom from dripping or running down the side when the bleach solution is poured from the lip of the bottle. The bottles of this invention provide a better closure seal than the untreated bottles. Torque tests show that for a given tightness of seal the caps are easier to remove from treated bottles than from untreated bottles. It was observed also that the tin-plated iron-based closures of the bottles of this invention, including the bottles of Examples I and II, can be more tightly affixed to the bottles than similar aluminum based caps, while the ease of removing the tin-plated, iron-based caps is substantially the same as that of the aluminum caps.

What is claimed is:

A glass bottle having an iron based metal cap and containing liquid hypochlorite bleach, the pouring lip area of said bottle having a water-repellant, heat cured film of a high molecular weight, non-volatile, dimethyl polysiloxane, said cap being a tin plated cap, the interior of which has a coating of a vinyl resin over a coating of epoxy resin, the combination of said film, said tin plate and said resin coatings providing resistance of said iron-based metal to corrosion by said bleach.

References Cited in the file of this patent

UNITED STATES PATENTS

| | | |
|---|---|---|
| 2,614,690 | Stoneman | Oct. 21, 1952 |
| 2,785,985 | Magill | Mar. 19, 1957 |
| 2,961,110 | Cooke et al. | Nov. 22, 1960 |